(12) United States Patent
Clemm et al.

(10) Patent No.: US 7,836,429 B2
(45) Date of Patent: Nov. 16, 2010

(54) DATA SYNCHRONIZATION MECHANISM FOR CHANGE-REQUEST-MANAGEMENT REPOSITORY INTEROPERATION

(75) Inventors: Geoffrey M. Clemm, Concord, MA (US); Elizabeth Miller, Lexington, MA (US); Lorelei Ngooi, Bedford, MA (US); Richard L. Piazza, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 11/612,703

(22) Filed: Dec. 19, 2006

(65) Prior Publication Data

US 2008/0148234 A1    Jun. 19, 2008

(51) Int. Cl.
G06F 9/44 (2006.01)
G06F 7/00 (2006.01)
(52) U.S. Cl. .................... 717/121; 717/170; 707/610
(58) Field of Classification Search .......... 717/121, 717/170; 707/610
See application file for complete search history.

(56) References Cited

U.S. PATENT DOCUMENTS

| | | | | |
|---|---|---|---|---|
| 6,615,166 | B1 * | 9/2003 | Guheen et al. | 703/27 |
| 7,278,106 | B1 * | 10/2007 | Mason | 715/744 |
| 7,318,070 | B2 * | 1/2008 | McGee et al. | 1/1 |
| 2002/0116702 | A1 * | 8/2002 | Aptus et al. | 717/170 |
| 2005/0268307 | A1 | 12/2005 | Gates et al. | |

FOREIGN PATENT DOCUMENTS

EP    1 681 652 A2    7/2006

OTHER PUBLICATIONS

Nuraminah et al., "Development of Software Configuration Management Repository", icime, 2009 International Conference on Information Management and Engineering, pp. 423-426.*
Gamma, E., et al., "Design Patterns: Elements of Reusable Object-Oriented Software Passage," *Design Patterns. Elements of Reusable Object-Oriented Software*, Chapter 1, pp. 1-9 and 207-217 (1995).
Gamma, E., et al., "Design Patterns: Elements of Reusable Object-Oriented Software," *Design Patterns. Elements of Reusable Object-Oriented Software*, pp. 139-161 (1995).

* cited by examiner

*Primary Examiner*—Wei Y Zhen
*Assistant Examiner*—Chih-Ching Chow
(74) *Attorney, Agent, or Firm*—Hamilton Brook Smith & Reynolds, P.C.

(57) ABSTRACT

Computer method and apparatus for managing software configuration repositories are disclosed. In a plurality of repositories each repository holds a respective set of change-request objects. One of the repositories in the plurality is a primary repository, and the other repositories are working repositories. In the primary repository, there is a respective proxy object for each change-request object of interest in a working repository. Each proxy object has a corresponding associated change-request object in the primary repository. For a given proxy object, changes made to the respective change-request object of interest in the working repository are mapped to the associated change-request object in the primary repository and vice versa.

15 Claims, 3 Drawing Sheets

DATA SYNCHRONIZATION MECHANISM FOR CHANGE-REQUEST-MANAGEMENT REPOSITORY INTEROPERATION

BACKGROUND OF THE INVENTION

A Change-Request-Management (CRM) system is used during development of a software system to record and track the changes which have been requested by the stakeholders (e.g., users, testers, developers, and designers) of that software system. It is common for multiple CRM repositories to be in use in a single organization. In some cases, this is because no one CRM repository has all the features needed by the organization. In other cases, this is because it takes a long time to transition all of the business processes and projects from one CRM repository to a different CRM repository, and so both CRM repositories remain in use for an extensive period of time. As a result, users that participate in multiple software development projects will often have to use multiple CRM repositories.

One approach to minimize training costs and user mistakes when a single user must interact with multiple CRM repositories is to host all of the CRM repository clients in a common GUI framework, but this can only address some generic aspects of the user interactions with the different CRM repositories. A deeper unification can be achieved when the CRM repositories provide an application programming interface (API). In this case, a single client can be implemented that can access multiple repositories, but this frequently leads to a "lowest-common-denominator" client that only provides functionality that is common to all of the CRM repositories.

In addition to the problems identified above there are several other important problems that are not addressed by a common GUI framework or a common client. In particular, there often are queries that must be run that require information from multiple CRM repositories, and there often are important relationships that must be captured and maintained between objects in different CRM repositories. In addition, executing these queries or traversing these relationships should be possible even when one of the required repositories is unavailable or unresponsive.

SUMMARY OF THE INVENTION

The present invention addresses the foregoing problems of the prior art. In particular, the present invention provides a data synchronization mechanism for change-request-management repository interoperation.

In a preferred embodiment a computer method and apparatus manages software configuration repositories. In a plurality of repositories each repository holds a respective set of change-request objects. One of the repositories in the plurality is a primary repository, and the other repositories are working repositories. In the primary repository, there is a respective proxy object for each change-request object of interest in a working repository. Each proxy object has a corresponding associated change-request object in the primary repository. For a given proxy object, changes made to the respective change-request object of interest in the working repository are mapped to the associated change-request object in the primary repository and vice versa.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
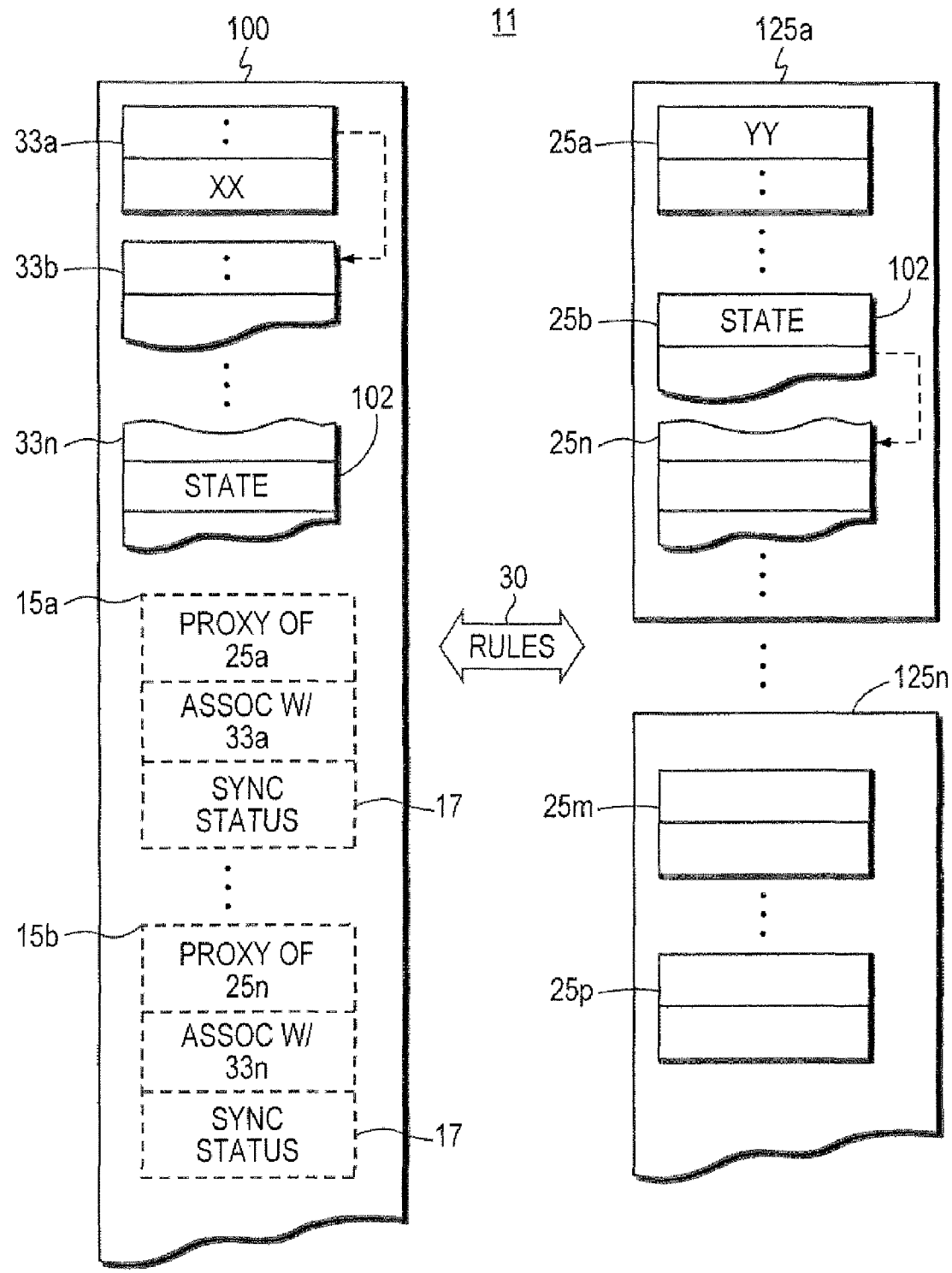
FIG. 1 is a block diagram of a change request management system embodying the present invention.

Illustrated in FIG. 1 is a Change Request Management (CRM) system 11 embodying the present invention. The Change Request Management system 11 may be part of a software configuration management system, new (e.g., U.S. patent application Ser. No. 11/555,521 by assignee, herein incorporated by reference) or known in the art or the like. According to principles of the present invention, in CRM system 11 there are two or more change management repositories 100, 125. In each change management repository 100, 125, there is maintained a respective set of objects 33, 25. Each set of objects 33, 25 captures a respective set of changes that have been requested by the developers and users of a software system (e.g., program). These change request objects 33, 25 are known by a variety of names in different change management repositories or software configuration management systems, such as Modification-Requests, Enhancement-Requests, Work-Items, Defects, and Bugs. In this disclosure, the term "Change-Request" is used to refer to these types of objects 25, 33.

The information about a change request is captured in a set of properties of the Change-Request object 25, 33. The property is represented by either an atomic value (such as a string, an integer, or a date) or a reference to another object 25, 33 as illustrated by the 'XX' and dotted line arrow, respectively, of object 33 in FIG. 1. Some properties are pre-defined and present on all Change-Request objects 33, 25, but most properties are determined by a customer, and can vary from project to project. The current state of a change request is summarized in a pre-defined State property 102 of the Change-Request object 33, 25. Although the State property 102 is pre-defined, the legal values of the State property are determined by a customer. The customer defines a set of allowed transitions from one State value to another, and defines the actions that perform those transitions.

One of the CRM repositories i 00 is selected as the "primary" CRM repository. All other CRM repositories 125 in use are considered "external" CRM repositories, also known as "working" CRM repositories. A copy (called a "proxy") is then created in the primary repository 100 for each object 25 in an working repository 125 that is to participate in cross-repository queries or has a relationship with an object 33 in another repository. Each proxy object 15 is then associated with a type of object 33 in the primary repository 100 that is closest semantically to the proxy object. Rules 30 (called "incoming synchronization rules") are then defined that map changes made to an object 25 in the working repository 125 into corresponding changes to the associated object 33 in the primary repository 100, i.e., the primary object 33 associated with the corresponding proxy object 15 of the subject object 25). Conversely, rules 30 (called "outgoing synchronization rules") are defined that map changes made to an object 33 in the primary repository 100 into corresponding changes to the associated object 25 in the working repository 125 (the association being defined through a respective proxy object 15).

The working repositories 125 are periodically queried to see if the state of an object 25 associated with a proxy 15 has changed, and if so, the proxy 15 is updated with the current state of that external object 25, and incoming synchronization rules (part of 30) are run to make corresponding changes to the primary repository object 33 associated with that proxy 15. Conversely, if the state of a primary repository object 33 that is associated with a proxy 15 is updated, outgoing synchronization rules are run to make corresponding changes to the state of the object 25 in the working repository 125 that is associated with (corresponds to) that proxy 15.

The following situations are handled by proxy management algorithms:

Process automation in a CRM repository 100, 125 can modify a requested update in arbitrary ways.

Process control in a CRM repository 100, 125 can abort a requested update to an object 25, 33 if the update violates the process defined for that object 25, 33.

Incoming synchronization rules may depend on values of fields in objects 25, 33 referenced by the object 33, 25 being synchronized.

An object 25 in an working repository 125 can be modified in parallel with the primary repository object 33 with which it is being synchronized.

In order to handle these situations, each proxy 15 is given a user-visible "synchronization status" field 17. To ensure that synchronization processing never blocks operations in either the primary 100 or working repository 125, changes can always be made to the associated item 33 or to the associated external object 25, no matter what the current synchronization status 17 is of the proxy 15 for that item or external object.

To handle all of the situations described above, the following proxy synchronization status values (for field 17) are defined:

PENDING: Incoming or outgoing synchronization is currently being performed by the proxy 15. Because the working repository 125 may be unavailable, a proxy 15 can have PENDING synchronization status for extended periods of time. This is the only synchronization status that will change without explicit user action.

UNINITIALIZED: This synchronization status is for an external object 25 whose state has never been retrieved from the working repository 125. This occurs when an external object 25 has a reference to another external object, but the state of that referenced object is not required for incoming synchronization. In this case, the state of the referenced external object 25 is not retrieved from the working repository 125, and the proxy 15 for the referenced external object is given UNINITIALIZED status 17. This is done because it is common for there to be a high degree of connectivity between change-request objects, and automatically retrieving the state of all referenced objects is likely to result in retrieving the state and creating a proxy 15 in the primary repository 100 for every change-request object 25 in the working repository 125. An UNINITIALIZED proxy will stay UNINITIALIZED until an explicit action by a user results in a request for it to be initialized.

OUTGOING-ERROR: When the item 33 associated with the proxy 15 has been changed, but outgoing synchronization failed while trying to update the associated external object 25, the synchronization status 17 of the proxy 15 is set to OUTGOING-ERROR. Because outgoing synchronization is affected both by the current state of the item 33 and by the current state of the associated external object 25, outgoing synchronization is retried on a proxy 15 with OUTGO IN-ERROR synchronization status whenever the item 33 or its associated external object 25 is modified.

INCOMING-ERROR: When the proxy 15 has been updated in response to a change to its associated external object 25, but incoming synchronization failed while trying to update the associated item 33, the synchronization status 17 of the proxy 15 is set to INCOMING-ERROR. As with outgoing synchronization, incoming synchronization is affected both by the current state of the external object 25 and by the current state of the associated item 33, so incoming synchronization is retried on a proxy 15 with INCOMING-ERROR synchronization status whenever the item 33 or its associated external object 25 is modified.

CONFLICT: Whenever both an item 33 and its associated external object 25 are modified in parallel, the proxy 15 will attempt to "auto-merge" the results of incoming synchronization with the changes made to the item 33. The auto-merge succeeds if no field in the item 33 is modified both by incoming synchronization and by changes to the item, and if the result of combining those changes does not violate any process defined in the primary repository 100. If the auto-merge does not succeed, the synchronization state 17 of the proxy 15 is set to CONFLICT. When a proxy 15 is in CONFLICT state, a user can perform a manual merge of the results of incoming synchronization and the changes to the item 33. If auto-merge succeeds or if a manual merge is performed, the state of the item 33 is updated to be the result of the merge, and standard outgoing synchronization is attempted with the new state of the item. Since the success of auto-merge is affected both by the current state of the external object 25 and by the current state of the associated item 33, auto-merge is retried on a proxy 15 with CONFLICT synchronization status 17 whenever the item or its associated external object 25 is modified.

CYCLE: Because process automation can be defined in the primary repository 100, when incoming synchronization modifies the state 102 of an item 33, the new state 102 of the item 33 must be inspected to determine whether it is different from the state defined by incoming synchronization. Any changes that resulted from process automation in the primary repository 100 must be applied to the corresponding external object 25 via outgoing synchronization. Conversely, because process automation can be defined in an working repository 125, when outgoing synchronization modifies the state 102 of an external object 25, the new state of the external object 25 must be inspected to determine whether it is different from the state defined by outgoing synchronization. Any changes that resulted from process automation in the working repository 125 must be applied back to the corresponding item 33 via incoming synchronization.

This process of successive incoming and outgoing synchronizations that result from a change to either an item 33 or its associated external object 25 could result in an infinite cycle of updates. For a simple example, process automation in the primary repository 100 could automatically set a field in the item 33 to false, while process automation in the working repository 125 could automatically set the corresponding field in the external object 25 to true. The proxy 15 must be designed to detect this kind of potential infinite loop in the synchronization processing.

In simple cases such as the preceding example, it could do so by keeping track of the states that have been produced by successive incoming synchronization without intervening user activity, but in general, the process can produce an extremely large number of states (such as by incrementing an integer), and therefore a simple loop counter is preferable. The process designer should be allowed to specify the maximum value of this counter, since the amount of legal cycling that is to be expected from process automation depends on the kind of process automation that has been defined.

OK: If the associated item 33 and the corresponding external object 25 are successfully synchronized, the synchronization state 17 of the proxy 15 is set to OK.

Figure 2:
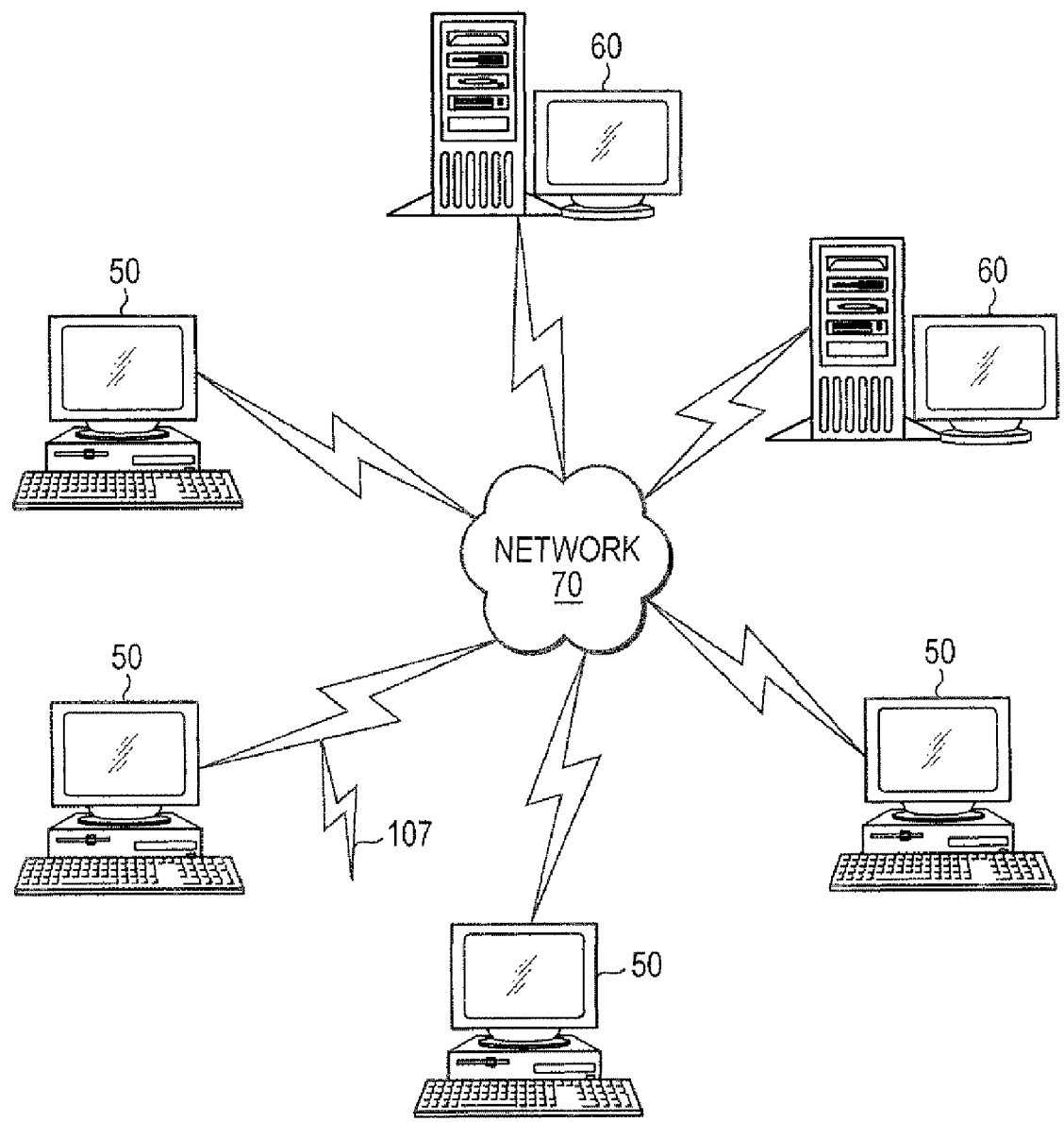
FIG. 2 is a schematic view of a computer network in which embodiments of the present invention operate.

FIG. 2 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 3:
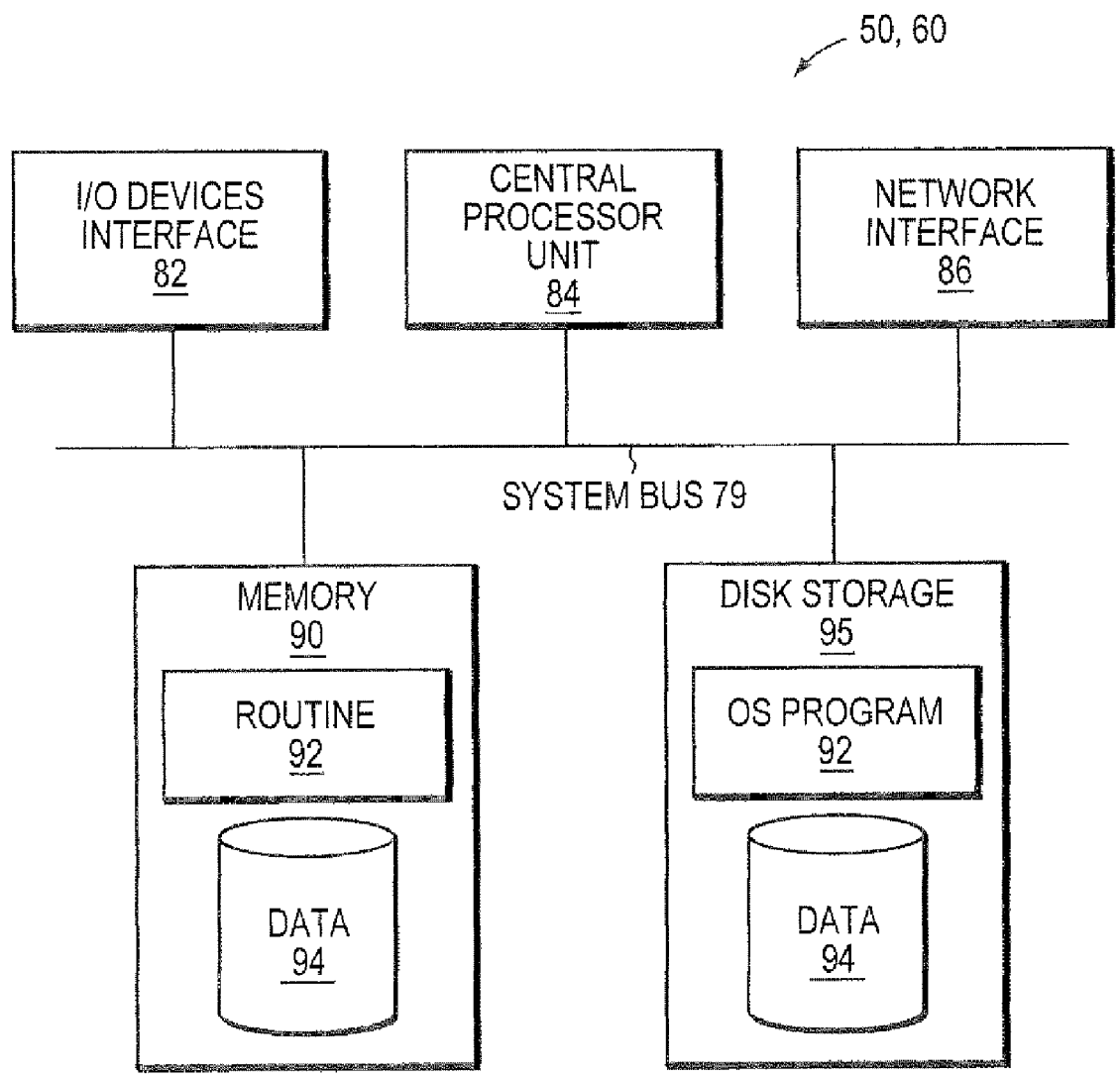
FIG. 3 is a block diagram of a computer node in the computer network of FIG. 2.

FIG. 3 is a diagram of the internal structure of a computer (e.g., client processor/device 50 or server computers 60) in the computer system of FIG. 2. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 2). Memory 90 provides volatile storage for computer software instructions 92 and data 94 used to implement an embodiment of the present invention (e.g., change-request objects 25, 33, proxy objects 15, CRM repositories 100, 125, rules 30 and corresponding operations detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to example embodiments thereof, it will be understood by those skilled in the art that various changes in form and details may be made therein without departing from the scope of the invention encompassed by the appended claims.

For example, other computer architectures and configurations instead of those described in FIGS. 2 and 3 are suitable.

Embodiments of the present invention are usable in software configuration management systems such as those described in U.S. patent application Ser. Nos. 11/459,743 and 11/561,558 (by the current assignee) herein incorporated by reference. Other software configuration management systems are suitable.

What is claimed is:

1. Computer apparatus comprising non-transitory computer-readable medium contains instructions for managing software configuration repositories comprising:
   a plurality of repositories each holding a respective set of change-request objects, the plurality repositories including a primary repository and working repositories; and
   in the primary repository, a copy of respective proxy object for each change-request object of interest in a working repository is created in the primary repository, wherein the change-request objects of interest include any of objects that are to participate in cross-repository queries, and objects that have relationships with objects in other repositories; and each proxy object has a corresponding associated change-request object in the primary repository; wherein for a given proxy object, changes made to one of the respective change-request objects of interest in the working repository and the associated change-request object in the primary repository are mapped to the other; wherein the mapping between the respective change-request object of interest in the working repository to changes made to the associated change-request object in the primary repository comprising:
      incoming synchronization rules for making corresponding changes to the associated change-request object in the primary repository corresponding to the proxy object; and
      outgoing synchronization rules, wherein for a given proxy object, when state of the associated change-request object is updated, the outgoing synchronization rules making corresponding changes to state of the change-request object of interest, in the working repository, corresponding to the proxy object.

2. Apparatus as claimed in claim 1 wherein for a given proxy object, the corresponding associated change-request object in the primary repository is an object of a type closest semantically to the proxy object.

3. Apparatus as claimed in claim 1 further comprising:
   rules for synchronizing changes to the associated change-request object in the primary repository to changes made to the respective change-request object of interest in the working repository; and
   rules for synchronizing changes to the respective change-request object of interest in the working repository to changes made to the associated change-request object in the primary repository.

4. Apparatus as claimed in claim 1 wherein a working repository is periodically queried to determine whether state of a respective change-request object of interest, in the working repository, corresponding to a proxy object has changed, and if so, the proxy object being updated with current state of the respective change-request object of interest.

5. A computer implemented method of managing software configuration repositories, comprising the steps of:
   in a plurality of repositories, each holding a respective set of change-request objects, providing one primary repository and remaining repositories being working repositories;
   for each change-request object of interest in a working repository, copying the change-request object of interest into the primary repository, wherein the change-request objects of interest include any of objects that are to participate in cross-repository queries, and objects that have relationships with objects in other repositories; forming a respective proxy object in the primary repository; and
   associating each proxy object with a change-request object in the primary repository, such that, for a given proxy object, changes made to one of the respective change-request object of interest in a working repository and the corresponding associated change-request object in the primary repository are mapped to the other; wherein the mapping between the respective change-request object of interest in the working repository to changes made to the associated change-request object in the primary repository comprising:
      incoming synchronization rules for making corresponding changes to the associated change-request object in the primary repository corresponding to the proxy object; and
      outgoing synchronization rules, wherein for a given proxy object, when state of the associated change-request object is updated, the outgoing synchronization rules making corresponding changes to state of the change-request object of interest in the working repository, corresponding to the proxy object.

6. A method as claimed in claim 5 wherein the step of associating each proxy object includes choosing a change-request object in the primary repository having a type closest semantically to the proxy object.

7. A method as claimed in claim 5 further comprising:
   synchronizing changes to the associated change-request object in the primary repository to changes made to the respective change-request object of interest in the working repository; and
   synchronizing changes to the respective change-request object of interest in the working repository to changes made to the associated change-request object in the primary repository.

8. A method as claimed in claim 5 further comprising: for each working repository, periodically querying the working repository to determine whether state of a respective change-request object of interest, in the working repository, corresponding to a proxy object has changed, and if so, updating the proxy object to the current state of the respective change-request object of interest.

9. A method as claimed in claim 8 further comprising the step of making corresponding changes to the associated change-request object in the primary repository corresponding to the proxy object.

10. A method as claimed in claim 9 further comprising:
    for a given proxy object, when state of the associated change-request object is updated, making corresponding changes to state of the change-request object of interest, in the working repository, corresponding to the proxy object.

11. A method as claimed in claim 5 wherein the step of forming a proxy object includes providing a user-visible synchronization status field for each proxy object.

12. A software configuration repository management system, comprising:
   a processor;
   repository means defining a primary repository and work repositories in a plurality of repositories, each defined repository having a respective set of change-request objects; and
   proxy object means, for each change-request object of interest in a working repository, the proxy object means providing a respective proxy object in the primary repository, wherein the change-request objects of interest include any of objects that are to participate in cross-repository queries, and objects that have relationships with objects in other repositories; each proxy object having a corresponding associated change-request object in the primary repository, wherein for a given proxy object, changes made to one of the respective change-request objects of interest in the working repository and the associated change-request object in the primary repository are mapped to the other;
   synchronization means for the mapping between the respective change-request object of interest in the working repository to changes made to the associated change-request object in the primary repository comprising:
      incoming synchronization rules for making corresponding changes to the associated change-request object in the primary repository corresponding to the respective change-request object of interest in the working repository; and
      outgoing synchronization rules, wherein for a given proxy object, when state of the associated change-request object is updated, the outgoing synchronization rules making corresponding changes to state of the change-request object of interest in the working repository, to the associated change-request object in the primary repository.

13. A system as claimed in claim 12 wherein a working repository is periodically queried to determine whether state of a respective change-request object of interest, in the working repository, corresponding to a proxy object has changed, and if so, the proxy object being updated with current state of the respective change-request object of interest.

14. A system as claimed in claim 13 further comprising synchronizing means for making corresponding changes to the associated change-request object in the primary repository corresponding to the proxy object.

15. Computer program product comprising a non-transitory computer usable medium having a computer readable program, wherein the computer readable program, when executed by a digital processor, causes a computer to:
   in a plurality of repositories, each holding a respective set of change-request objects, provide one primary repository and remaining repositories being working repositories;
   for each change-request object of interest in a working repository, copy the change-request object of interest into the primary repository and form a respective proxy object in the primary repository, wherein the change-request objects of interest include any of objects that are to participate in cross-repository queries, and objects that have relationships with objects in other repositories; and
   associate each proxy object with a change-request object in the primary repository, such that, for a given proxy object, changes made to one of the respective change-request objects of interest in a working repository and the corresponding associated change-request object in the primary repository are mapped to the other; wherein the mapping between the respective change-request object of interest in the working repository to changes made to the associated change-request object in the primary repository comprising:
      incoming synchronization rules for making corresponding changes to the associated change-request object in the primary repository corresponding to the proxy object; and
      outgoing synchronization rules, wherein for a given proxy object, when state of the associated change-request object is updated, the outgoing synchronization rules making corresponding changes to state of the change-request object of interest, in the working repository, corresponding to the proxy object.

* * * * *